United States Patent [19]

Magnusson

[11] 3,768,825
[45] Oct. 30, 1973

[54] STEERING DEVICE FOR BUSES
[75] Inventor: Gunnar Ivar Lennart Magnusson, Goteborg, Sweden
[73] Assignee: Aktiebolaget Volvo, Goteborg, Sweden
[22] Filed: Dec. 14, 1971
[21] Appl. No.: 207,814

[30] Foreign Application Priority Data
Dec. 17, 1970 Sweden.............................. 17109/70

[52] U.S. Cl.............. 280/96, 280/81.5, 280/96.2 R, 280/103, 280/112 R, 280/124 R
[51] Int. Cl............................ B62d 3/04, B62d 7/16
[58] Field of Search............... 280/95 R, 96, 96.2 R, 280/106.5, 103, 111, 112 R

[56] References Cited
UNITED STATES PATENTS

| | | | |
|---|---|---|---|
| 2,692,778 | 10/1954 | Stump................................ | 280/95 R |
| 2,297,591 | 9/1942 | Urich................................. | 280/95 R |
| 3,021,150 | 2/1962 | Ulinski.............................. | 280/96 X |
| 1,356,473 | 10/1920 | Schofield........................... | 280/96 X |
| 2,444,025 | 6/1948 | Austin............................... | 280/95 R |
| 2,044,809 | 6/1936 | Rabe.................................. | 280/96 |
| 2,911,229 | 11/1959 | Strehlow............................ | 280/96 |
| 1,476,068 | 12/1923 | Froelich............................ | 280/96 X |
| 1,987,791 | 1/1935 | Opolo............................... | 280/95 R |
| 3,073,616 | 1/1963 | Stump................................ | 280/95 R |
| 2,469,244 | 5/1949 | Rowland............................ | 280/95 R |

Primary Examiner—Kenneth H. Betts
Assistant Examiner—John P. Silverstrim
Attorney—Edward Taylor Newton et al.

[57] ABSTRACT

A steering mechanism for buses comprising obliquely outwards directed steering links being hingedly connected to an upright steering link shaft by means of outwardly directed levers. The upright steering link shaft is mounted for rotation upon turning of the vehicle steering wheel and constitutes the output shaft of the servo steering worm which is centrally located on the axle frame on which said upright shaft is likewise mounted so as to partake in the springing movements of said axle frame. The point in which the steering movement transmission means are mounted on the chassis frame is positioned approximately in the same vertical plane normally relatively the vehicle longitudinal axis as the suspension and bearing point of the axle frame on the chassis frame.

5 Claims, 5 Drawing Figures

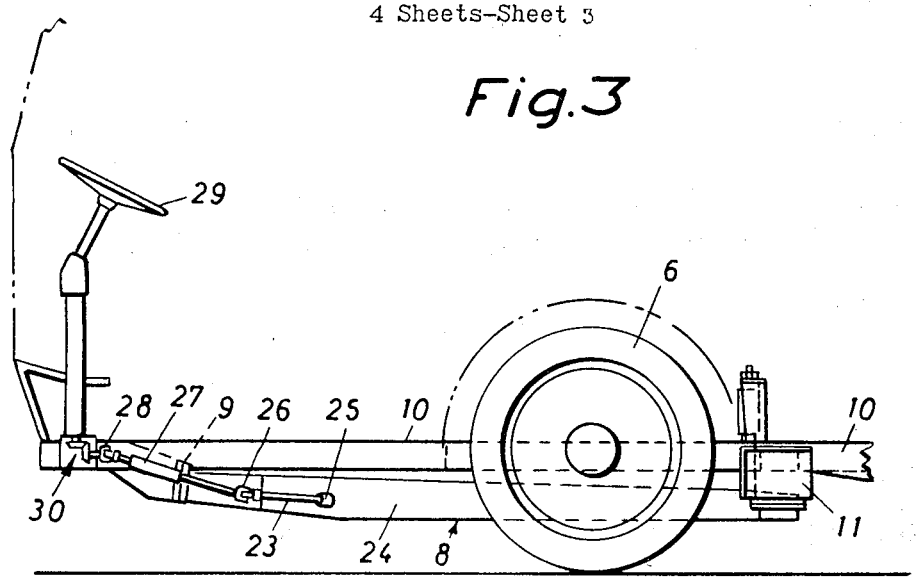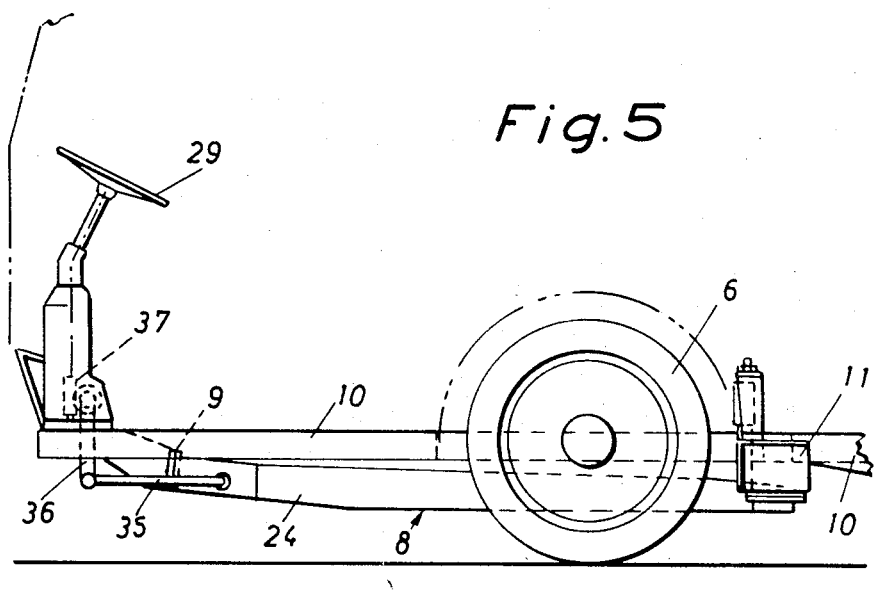

STEERING DEVICE FOR BUSES

BACKGROUND OF THE INVENTION

In a known steering device for buses, the hubs for the front running wheels are each one pivotally mounted on the outer ends of the front wheel axles on their respective steering pivot or swivel pin and are provided with one lever each extending obliquely inwards. These levers are interconnected by a track or tie rod. One of the front wheel hubs — in left hand drive vehicles the left hub — is also provided with a second, inwardly directed lever which by means of a traction and pressure rod is pivotally connected to a steering worm operable through the vehicle steering wheel. Said rod extends essentially in parallel with the longitudinal axis of the vehicle. When the vehicle is driven through a right hand curve or bend the degree of deviation of the left front wheel will be limited by this rod. An inevitable consequence thereof is that the turning circle of the vehicle necessarily becomes relatively large.

SUMMARY OF THE INVENTION

The purpose of the present invention is to remedy this drawback while retaining a low space for housing the various parts of the steering device and preserving the satisfactory suspension qualities of the bus. The invention is characterised in that outwardly directed steering links at those ends thereof which are closest to the vehicle longitudinal axis are hingedly connected to outwardly and obliquely directed levers mounted on an essentially vertical steering link shaft which may be turned upon rotation of the vehicle steering wheel and which is positioned close to the vehicle longitudinal axis, and in that said shaft is mounted on the spring-suspended wheel axle frame so as to partake in the wheel axle movements, and in that the bearing point on the chassis frame in which point the steering movement transmission means between the chassis frame and the wheel axle frame are mounted, is positioned approximately in the same vertical plane at right angles relatively the vehicle longitudinal axis as the moment-less suspension and bearing point of the wheel axle frame on the chassis frame. No track rod is required. By arranging the steering links in a position extending obliquely outwards it is possible to achieve a considerably wider deflection of the front wheels, making possible an extremely reduced turning circle. Because the journalling point of the steering movement transmission means on the chassis frame is positioned closely adjacent the moment-less suspension point of the wheel axle frame the suspension and tilting movements of said frame relatively the chassis frame during driving of the vehicle will not have a negative effect on the steering movements.

BRIEF DESCRIPTION OF THE DRAWINGS

The invention will be described in detail in the following with reference to the accompanying, partly diagrammatic drawings, wherein FIG. 3 is a side view of the vehicle front portion as seen from the left, FIG. 5 is a side view of the steering device as seen from the left.

DETAILED DESCRIPTION OF A PREFERRED EMBODIMENT

Figure 1:
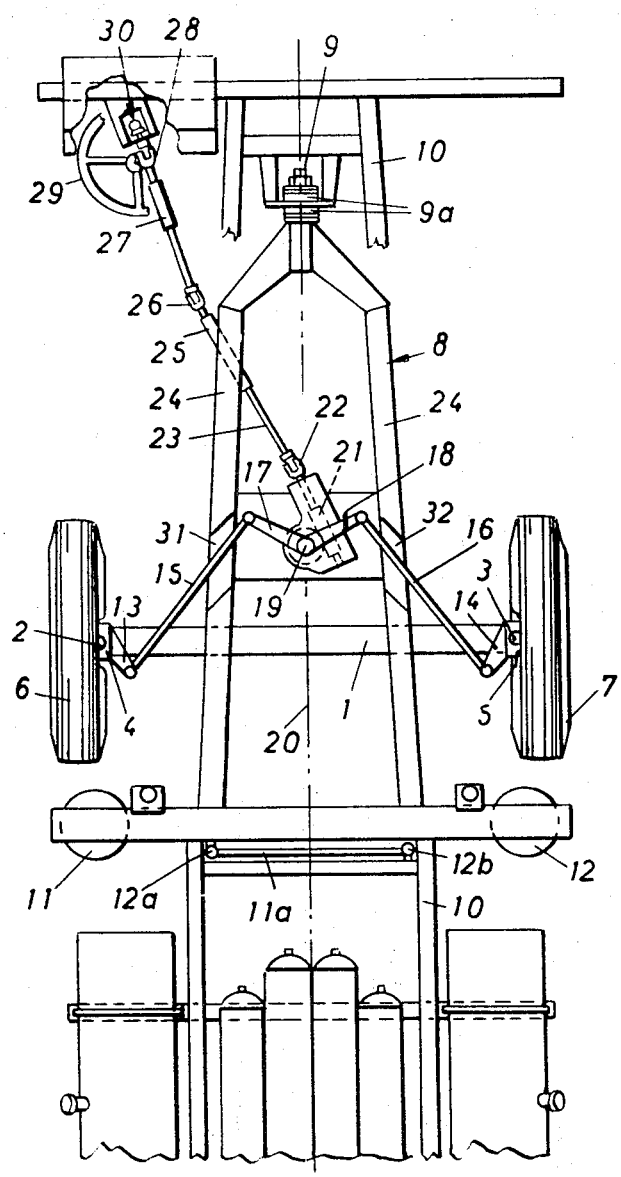
FIG. 1 is a plan view of a steering device in accordance with the invention, illustrating the front running wheels of the bus in a position wherein they point straight forwards.

The front wheel axle 1 of the vehicle is in accordance with common practice provided at its ends with upright steering pivot or swivel pins 2, 3, on which are mounted the hubs 4 and 5, respectively, of the two front running wheels 6, 7. The wheel axle 1 is supported by a longitudinal frame 8 which by means of a bolt 9 and a mechanism 9a mounted so as to have but an insignificant elastic deflection axially is suspended free of moment at the front of the vehicle chassis frame 10 while at the rear end the frame, by means of spring mechanisms 11, 12, comprising air bellows, supports the chassis frame 10 at a point positioned beyond the front wheels 6, 7. Owing to this construction, the chassis frame 10 will move relatively the wheel axle 1 during driving on account of the springing effect. A schematically indicated rod system 11a and 12a, 12b, for instance a so called Panhard rod, prevents the wheel axle frame 8 from swinging to any appreciable degree laterally relatively the chassis frame 10.

The hubs 4, 5 are provided with one lever 13, 14 each, extending inwardly in an oblique direction. These levers are articulated to steering links 15, 16 pivotally linking said levers to the outer end of their associated lever 17, 18, which levers extend from a vertical shaft 19 positioned adjacent the vehicle longitudinal axis 20. The shaft 19 constitutes the output shaft of a serve-operated worm 21 which is located centrally on the wheel axle frame 8. Via a universal joint 22 the input shaft of the steering worm 21 is connected to a shaft 23 which is rotatably mounted in a bearing 25 passing through one of the longitudinal beams 24 of the wheel axle frame 8. The shaft 23 is connected at its outer end by means of a universal joint 26 to a telescope shaft 27 which shaft is connected by means of universal joint 28 to an angle gear 30 which may be turned with the aid of the vehicle steering wheel 29.

Steering links 15, 16 pass freely through oblong openings 31, 32 made in the longitudinal beams 24 of the wheel axle frame 8.

Figure 2:
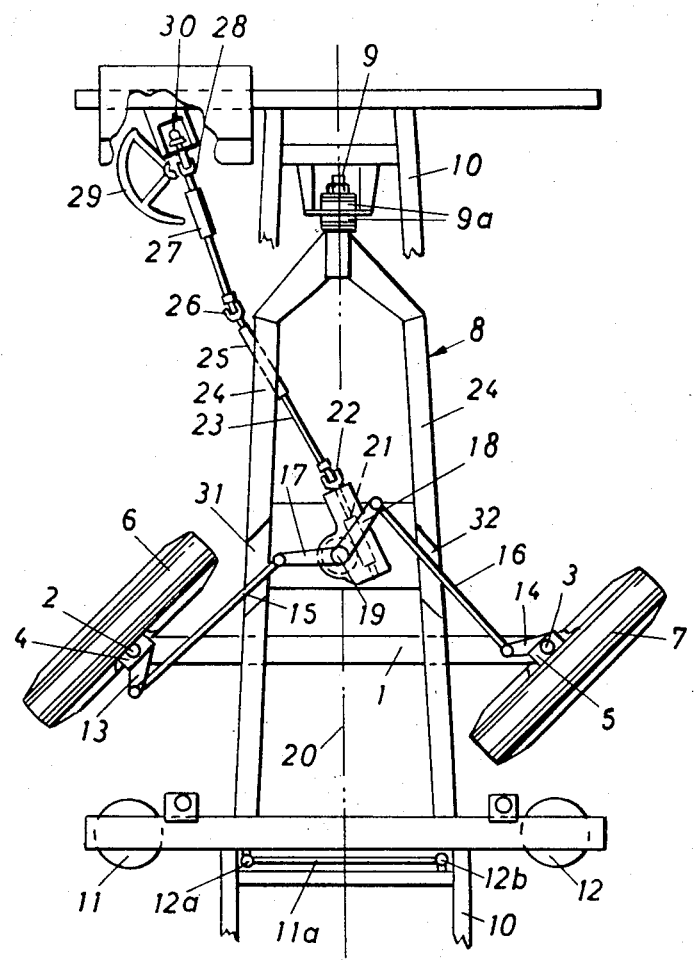
FIG. 2 is a similar plan view illustrating the running wheels in a position wherein they point obliquely to the right.

When the steering wheel 29 is being turned, the turning movement is transmitted to the output shaft 19 of the servo steering worm, resulting in a joint swinging movement of levers 17, 18 either clockwise or anti-clockwise depending upon the rotary movement of the steering wheel 29. FIG. 2 illustrates the wheels 6, 7 having been turned sharply to the right. From this figure appears that the angular deflection or deviation of the wheels is extremely high and consequently the vehicle turning radius small.

Figure 4:
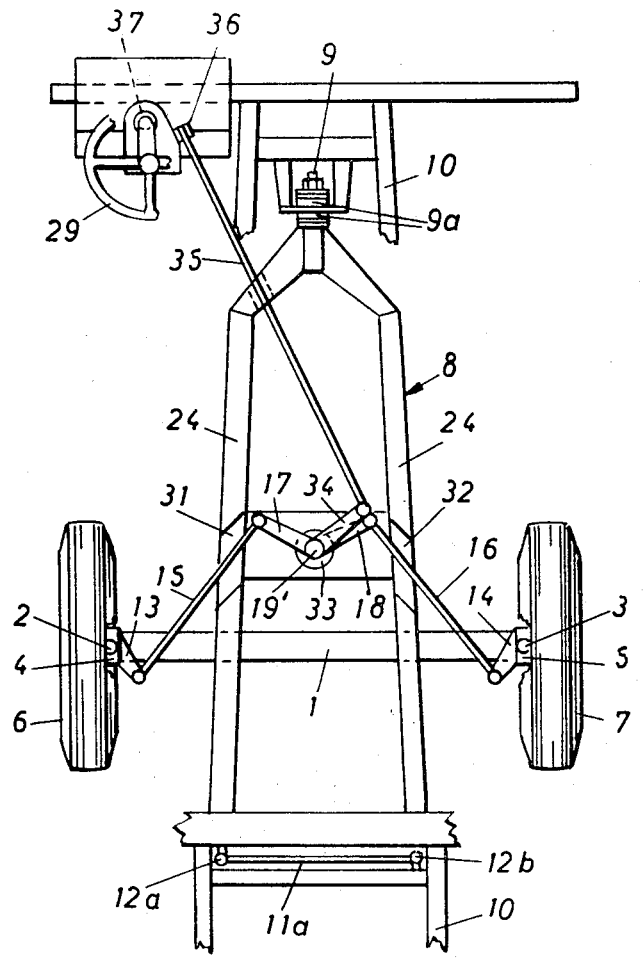
FIG. 4 is a plan view of a steering device in accordance with a modified embodiment of the invention.

It appears from FIGS. 4 and 5 that the steering worm need not necessarily be provided on the wheel axle frame 8. In accordance with the embodiment illustrated in these two figures the shaft 19' of the levers 17, 18 is mounted in a bearing 33 arranged centrally on the wheel axle frame 8. From shaft 19' also projects a lever 34 which by means of a traction and pressure rod 35 is pivotally connected to the lower end of an opening arm 36 which by means of a steering worm 37, mounted on the chassis frame 10 and operable through the steering wheel 29, may be swung in a vertical plane.

It is evident that in conformity with the above description it is possible to provide, upon operating the steering wheel 29, a change of a lignment of the wheels 6 and 7 also to achieve an extremely small turning radius with the use of this steering mechanism.

The embodiments as described above and illustrated in the accompanying drawings are to be regarded as examples only and various details thereof may be constructively altered in various ways within the scope of the appended claims. It is of course possible to make shaft 19' rigid and to form levers 17, 18 integral with each other or rigidly interconnected and pivotally mounted about the shaft.

What I claim is:

1. An improved steering mechanism for buses, comprising: front running wheels; steering pivot pins mounted on the front wheel axle of the vehicle; a vehicle steering wheel and steering movement transmission means arranged to effect turning of said running wheels jointly about their respective pivot pin; a vehicle chassis frame; a second frame supporting said wheel axle and being located below the vehicle chassis frame and attached thereto, at its front end, through a moment-free connection and at its rear end through a spring-suspended connection positioned behind said front running wheels; an essentially vertical steering link shaft arranged for turning upon rotation of the vehicle steering wheel and positioned close to the vehicle longitudinal axis, said vertical steering link shaft being mounted on and within said second frame at a point between said moment-free and spring-suspended connections so as to partake in the wheel axle movements; said steering movement transmission means being mounted on said vehicle chassis frame and being positioned approximately in the same vertical plane extending at right angles to the vehicle longitudinal axis as said moment-free connection of said second frame to said vehicle frame; steering movement coupling means coupling said steering movement transmission means to said vertical steering link shaft; and linkage means including obliquely outwardly directed steering links coupling said vertical steering link shaft to said front running wheels, whereby upon steering movements of said steering wheel said front running wheels may be deflected through a wide angle.

2. An improved steering mechanism in accordance with claim 1, wherein said steering movement coupling means comprises a servo steering worm centrally located on said frame, said steering worm being driven by said transmission means and driving said vertical steering link shaft.

3. An improved steering mechanism in accordance with claim 2, wherein said steering movement coupling means further comprises a shaft rotatably mounted in said frame, said shaft coupling movement from said transmission means to said servo steering worm.

4. An improved steering mechanism in accordance with claim 3, wherein said drive means further comprises a telescope shaft.

5. An improved steering mechanism in accordance with claim 1, wherein said steering links pass freely through openings provided through longitudinal beams of said second frame.

* * * * *